Patented June 1, 1943

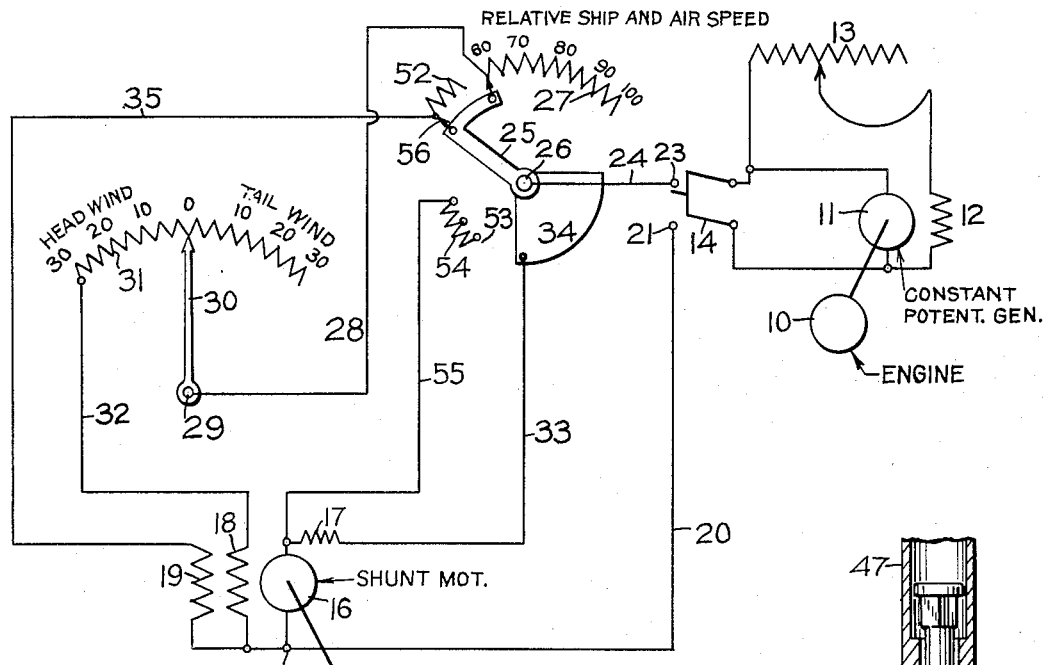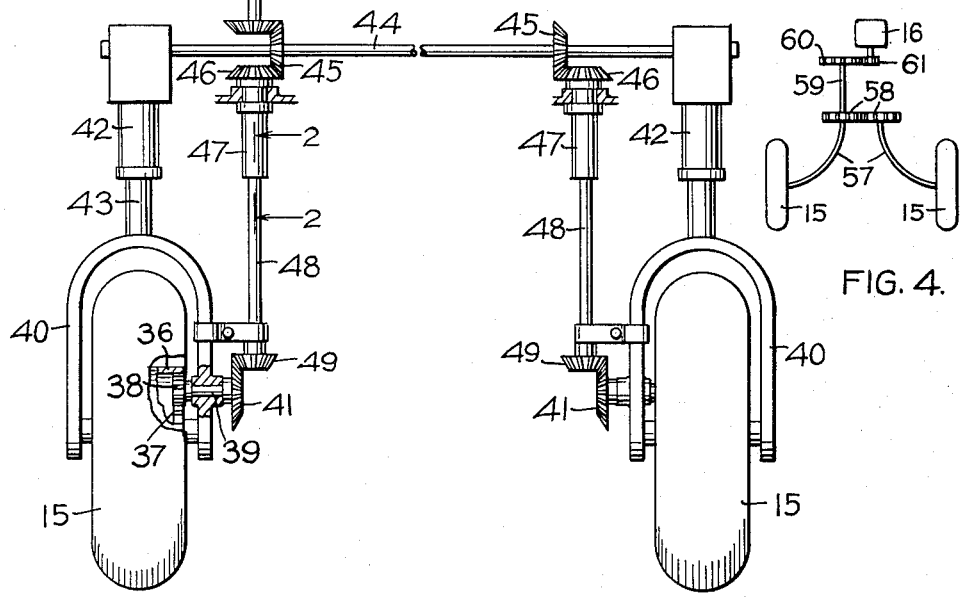
FIG. 2.
FIG. 4.
FIG. 1.
ROY L. TIGER, INVENTOR.
BY Martin E. Anderson
ATTORNEY

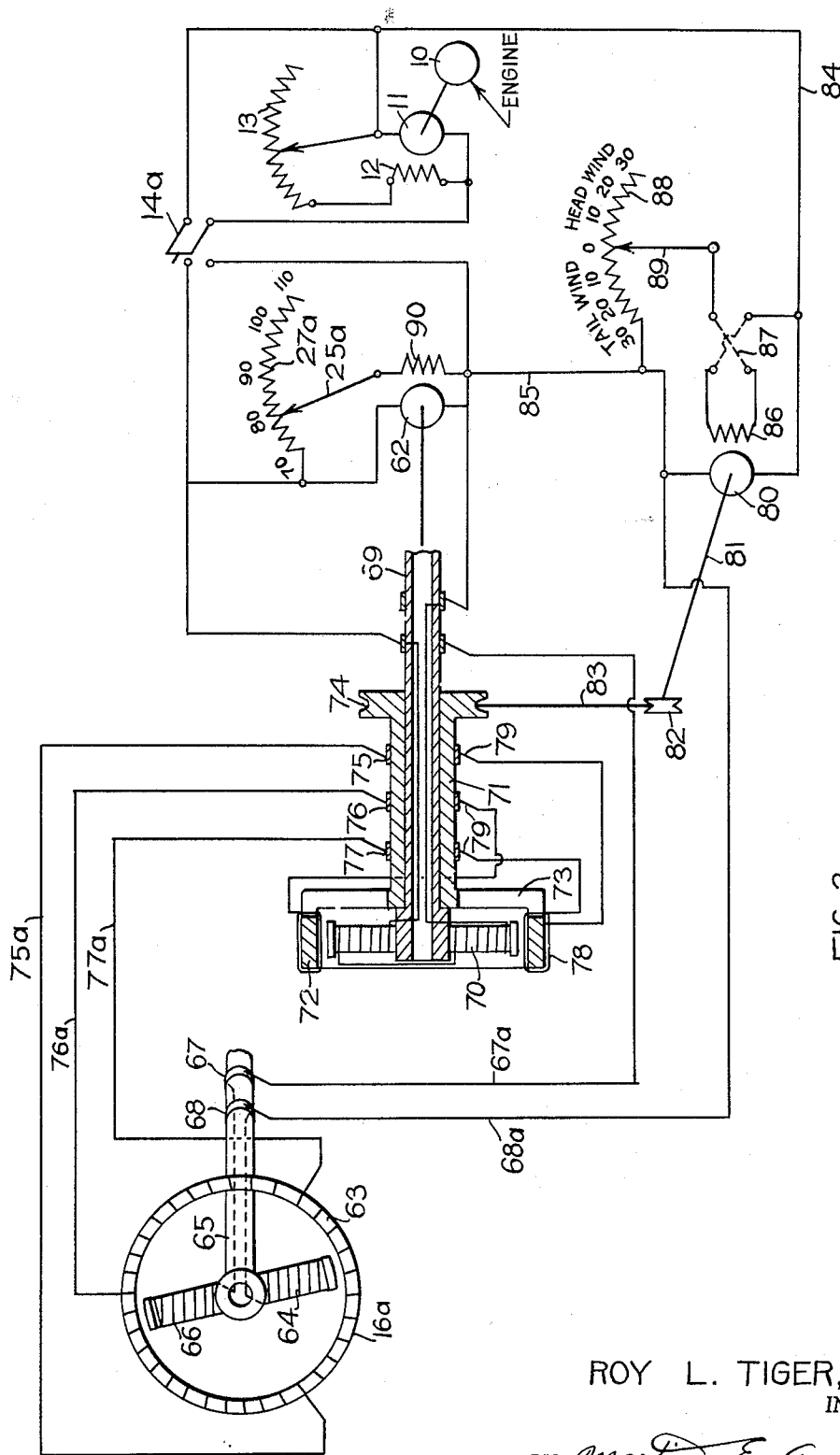

2,320,547

UNITED STATES PATENT OFFICE 2,320,547

LANDING WHEEL ROTATING DEVICE FOR AIRPLANES

Roy L. Tiger, Boulder, Colo.

Application January 30, 1942, Serial No. 428,929

12 Claims. (Cl. 244—103)

This invention relates to improvements in landing wheel rotating devices for airplanes.

It has been recognized for a long time that the reason the pneumatic tires of airplanes wear so rapidly is that their inertia prevents them from beginning to rotate at the relative plane and ground speed until a short time after they make engagement with the surface of the landing field, and as a result of this lag, due to the inertia, the wheels slide on the surface of the landing field for some distance before they begin to rotate at the required speed and this sliding wears away the surface of the rubber.

Attempts have been made to overcome this difficulty and among other inventions for this purpose are tires which are provided with outwardly extending vanes that are engaged by the air currents and serve to start the wheels rotating.

It is not the intention to review the prior art but attention has been called to the means above described for the purpose of more clearly defining the present invention.

It is evident that the ideal conditions would be obtained if it were possible to determine the exact relative movement between the plane and the surface of the landing field at the time of landing and then to rotate the wheels at a peripheral speed equal to the landing speed of the plane. It is, of course, quite impossible to determine with absolute accuracy the speed at which a plane will be moving relative to the ground at the time of landing, but a very close approximation of this can be made by the employment of suitable means.

Most airplanes are provided with a device for determining relative plane and air speed and this speed can be quickly determined by the pilot as it is registered by certain instruments provided for the purpose.

If there were no relative movement between the air and the ground, the relative plane and air speed would also equal the relative plane and ground speed, but when the air moves relative to the earth so as to produce what is commonly referred to as wind, the relative plane and ground speed will vary from the relative plane and air speed by an amount equal to the component of the wind's velocity in the direction of landing. The wind velocity component may be either positive or negative, depending on whether the landing is made with or against the wind.

It is the object of this invention to produce a mechanism by means of which the landing wheels of an airplane can be set in motion while the plane is still in the air and by means of which the wheels can be made to rotate at a peripheral speed equal to the estimated relative plane and ground speed at the time of landing.

The above and other objects of this invention are attained by means of a combination of elements which will now be briefly described.

Each wheel, or each set of wheels are provided with a motor means that can be controlled by the pilot, two separate control means being provided for this purpose.

The pilot having first decided on the most desirable plane and ground speed at landing, adjusts his propelling mechanism so as to get a relative plane and air speed equal to the landing speed decided on. He then starts a set of motors which are controlled by a suitable speed control mechanism calibrated in such a way that the peripheral speed of the landing wheels can be brought to any desired value by the adjustment of a handle moving over a scale calibrated in peripheral speed of the landing wheels, for example, in number of miles per hour.

After the wheels have been brought up to the desired peripheral speed, the pilot contacts the airport and obtains a report stating the wind velocity in miles per hour in the direction of landing. The pilot now operates another lever which controls the motors in a manner to modify the peripheral speed of the wheels so as to increase or decrease their speed over the relative air and plane speed in an amount equal to the value of the wind speed component in the direction of landing. When the speed of the wheels has thus been adjusted, the landing can be effected without shock because at the time the wheels engage the surface of the landing field, they will be rotating at the same or very near the same speed as that at which the plane is moving.

Having thus briefly described the invention, the same will now be described in detail, and for this purpose reference will be had to the accompanying drawings in which it has been illustrated, and in which:

Figure 1 is a view showing, in a diagrammatic manner the relative position of the several elements comprising this invention;

Figure 2 is a section taken on line 2—2, Figure 1;

Figure 3 is a diagrammatic representation showing the relative position of the several elements in a modified form of the invention; and Figure 4 is a diagrammatic view showing other means of transmitting power to the landing wheels.

The invention will be first described in connection with the embodiment illustrated in Figure 1 where a direct current transmission apparatus has been illustrated.

In Figure 1, reference numeral 10 designates the engine which may be the main driving engine of the airplane or may be an air propeller furnishing power for driving the shunt direct current generator 11. This generator is provided with the ordinary shunt field 12 and an adjustable field rheostat 13. Reference numeral 14 designates the main line switch. The motor which furnishes the power for driving the landing wheels 15 has been designated by reference numeral 16. This motor is a compound wound shunt motor in which the series field coil has been indicated by reference numerals 17 and the ordinary shunt field winding by reference numeral 18. The motor is also provided with an auxiliary shunt field 19.

It may be explained at this point that due to the great inertia of the landing wheels 15, it is necessary to provide a motor having a very strong torque to start the wheels rotating and to bring them up to a certain speed, and motor 16 has therefore been so designed as to make it possible to obtain a field strength limited only by the magnetic saturation of the magnetic circuit.

Conductor 20 connects the terminal 21 of the control switch 14 with terminal 22 of the motor and also with one end of each of coils 18 and 19. Terminal 23 of control switch 14 is connected by means of a conductor 24 with a field rheostat control arm 25 that has been shown as pivoted at 26. An adjustable resistance 27 is connected by means of a conductor 28 to the pivot point 29 of the rheostat arm 30 which cooperates with the resistance 31 of another field rheostat. The resistance 31 is connected by means of a conductor 32 to the other terminal of the shunt field 18.

Assuming now that the control switch 14 is closed, current will flow through conductor 20 to the motor armature and through the shunt field 18, thence through conductor 32, resistance 31, rheostat arm 30, conductor 28, rheostat arm 25 and thence through conductor 24 to the opposite side of the generator 11.

In order to obtain a strong field at starting, conductor 33 is shown as connected to the series field coil 17. When the parts are in the position shown in Figure 1, it is obvious that current will flow from the switch contact 23, through the arcuate contact member 34, thence through conductor 33 and series field 17, and we therefore have a compound wound motor giving a high starting torque.

In order to produce the most powerful field possible with the particular magnetic circuit employed, the auxiliary shunt field 19 has been provided and when the rheostat arm 25 is in the starting position shown in Figure 1, current will flow from it through the conductor 35 to and through the auxiliary field coil 19.

Since the motor 16 must rotate the wheels 15, some suitable means of power transmission for this purpose must be provided and in Figure 1 a means has been illustrated as an example. In the embodiment illustrated the brake drums 36 have been shown as provided with a ring gear 37 with which a pinion 38 is rotatively associated. A shaft 39 extends through a suitable bearing in the wheel fork 40 and has connected with the outside thereof, a bevel gear 41. The wheels are provided with the usual shock absorbers comprising two telescopic members 42 and 43 and are pivoted to swing about the axis of shaft 44. Shaft 44 is provided with bevel gears 45 that mesh with suitable gears 46 secured to the upper ends of tubular shafts 47. Shafts 48 are telescopically connected with the hollow shafts 47 in the manner shown in Figure 2, and secured to the lower ends of shafts 48 are pinions 49 that cooperate with the bevel gears 41. The motor has been shown as connected with shaft 50 by means of a flexible shaft connection embodying a universal 51.

It is now evident that whenever motor 16 rotates, it will cause a corresponding rotation of the landing wheels 15. The telescopic connection between shafts 47 and 48 permits these two shafts to move in a manner corresponding to the two parts 42 and 43. After the wheels touch the ground, the driving connection between shafts 47 and 48 is broken in the manner indicated in Figure 2.

Let us now assume that the airplane is about to land and that the most suitable relative plane and ground speed for landing has been found to be eighty miles per hour. A short time before reaching the airport, the pilot closes switch 14 with the parts in the position shown in Figure 1. This immediately energizes the three field coils and simultaneously therewith permits current to flow through the armature. The heavy torque thus generated enables the motor to start the heavy wheels rotating and the parts are left in this position for a time sufficient to bring the speed of the wheels to the maximum for the circuit connection shown. After the speed of the wheels has reached the maximum for this particular setting, the pilot moves the rheostat arm 25 in a clockwise direction, thereby introducing the resistance 52 into the auxiliary field circuit and at the same time introducing a portion of the field rheostat resistance 27 in series with the shunt field. This gradual reduction of field strength will cause the shunt motor to increase its speed. When the arm 25 has moved through a sufficient arc to bring the quadrant 34 into electrical contact with contact member 53, a shunt will be established around the series field 17 and as the rheostat arm is moved farther in a clockwise direction, the resistance 54 will gradually be eliminated from the shunt until at last this resistance is entirely removed, leaving only the resistance of conductor 55 thereby establishing a low resistance shunt around a series field 17 whereby the latter will be eliminated and finally after the quadrant 34 has moved to its maximum clockwise position, the series field 17 is entirely eliminated. The rheostat arm 25 has an indicator 56 which passes over the scale arranged along the resistance 27 and when this indicator is positioned so as to point to the number 60, the peripheral speed of the landing wheels will be sixty miles per hour. When the indicator points to 70, the peripherial speed will be seventy miles per hour, until the maximum of one hundred miles per hour has been obtained.

Each airplane is provided with a device that indicates the relative plane and air speed and if the air does not move relative to the earth the relative plane and air speed also indicates the relative plane and ground speed and in such case no further adjustments need be made, as the pilot, by properly positioning the rheostat arm 25 can effect a peripherial rotation of the landing wheels to correspond exactly with the plane and ground speed at landing.

In many instances landing must be made at times when the air moves relative to the earth or when there is considerable wind. In order to properly adjust the peripherial speed of the landings wheels to compensate for the component of the wind in the direction of landing, another adjustment of the speed must be made. In such instances, the pilot communicates with the airport and obtains from them the relative air and ground speed in the direction of landing. This may be either in a direction opposite to that of landing, or in the same direction, or, in other words, the landing may have to be made against a head wind or with a tail wind. If the landing is made in a tail wind blowing ten miles an hour, it is evident that the relative plane and ground speed will be ten miles an hour greater than the relative plane and air speed and in order to compensate for this, the motor 16 must be further adjusted, as to speed, to compensate for this increased relative plane and ground speed. After receiving the proper instructions from the air field, the pilot moves the control lever 30 to a point corresponding to the relative air and ground speed in the direction of landing whereupon the motor will either increase or decrease in an amount sufficient to effect the corresponding change in the peripherial speed of the landing wheels.

It is evident from the above description that with the mechanism shown on the drawings and described herein, it is possible, with a properly calibrated mechanism, to produce a peripherial speed of the landing wheels corresponding exactly to the relative plane and air speed at the time of landing and when such an adjustment has been made, the plane will land without shock as the wheels will be rotating at the proper speed.

It is evident that if the wheels were standing still the shock at landing would be very great as the inertia of the wheels would prevent them from turning for some time after striking the ground. In a similar way, if the wheels are rotating too fast, there will be a tendency to jerk the plane forward when striking the ground.

The mechanism for transmitting motion from motor 16 to the wheels has been illustrated merely to show one example of such means. In Figure 4 another and simpler motion transmission mechanism has been shown. In this mechanism flexible shafts 57 are connected with the landing wheels by suitable means, such as the ring gear 37 and pinion 38 and these flexible shafts are interconnected by means of spur gears 58. A shaft 59 connects one of the spur gears 58 with another gear 60 that in turn connects with a pinion 61 driven by the motor 16. Such a motion transmission device can be substituted for the other one wherever it may be found suitable.

It is also possible to provide each wheel with a motor like that designated by reference numeral 16. Since the specific manner of transmitting motion from the motor 16 to the wheel can be varied to suit different conditions and since the speed control mechanism is independent of the motion transmission mechanism, the latter has been illustrated merely to show a means for this purpose.

In Figure 3, a mechanism has been shown in which an alternating current mechanism has been substituted for parts of the direct current mechanisms illustrated in Figure 1. The engine 10 and shunt generator 11 are the same as that illustrated in Figure 1. Current from the generator 11 is transmitted to the shunt motor 62 whose speed is controlled by means of the field rheostat embodying the resistance 27a.

Rheostat control 25a can be adjusted along the resistance 27a into positions corresponding to the relative plane and air speed at landing. Instead of the motor 16, a three-phase synchronous motor 16a is provided either one for the two wheels in the manner shown in Figure 1, or a separate one for each wheel. The motor field has been designated by reference number 63 and has been shown as connected delta. The rotor 64 has been shown as secured to the motor shaft 65. The rotor coils 66 are connected to slip rings 67 and 68 to which reference will hereinafter be made. Motor 62 is connected with the tubular shaft 69 and this shaft carries a rotating field 70 of substantially the same construction as the rotor shown in connection with motor 16a. Rotatably mounted on shaft 69 is a short tubular shaft 71, to one end of which a circular armature 72 is connected by a plurality of radially extending arms 73. The other end of shaft 71 has been shown as provided with a grooved pulley 74. Slip rings 75, 76 and 77 are secured to the outer surface of shaft 71. These rings are connected to the armature coil 78 at points spaced 120 degrees apart and are electrically connected with the slip rings by means of brushes 79. Conductors 75a, 76a and 77a connect the corresponding slip rings with points spaced one hundred twenty degrees apart on the stator 16a. A direct current shunt wound motor 80 has a shaft 81 provided with a grooved pulley 82 from which a belt 83 extends to the groove pulley 74. Motor 80 is connected with the terminals of generator 11 by means of conductors 84 and 85. The shunt field 86 has been shown as provided with a reversing switch 87 and a rheostat having a resistance 88 and an adjustable rheostat arm 89 is shown in series with the shunt field 86.

Let us now assume that the generator 11 is operating and providing current at the proper voltage. This current is conducted to the motor 62 by the conductors illustrated and current for the shunt coil 90 can be made to pass through any desired amount of the resistance 27. The rheostat comprising the arm 25a has been carefully calibrated to indicate the peripherial speed of the landing wheels corresponding to given positions of the rheostat arm in the same manner as explained in Figure 1. When motor 62 operates, it rotates the tubular shaft 69 and the field 70 thereby generating current in the armature coil 78. The connection at points spaced one hundred twenty degrees apart produces a three-phase current in conductors 75a, 76a and 77a. When the rotor 70 turns at a given speed while the armature 72 remains stationary, a certain frequency will be generated but if the armature 72 is rotated at a speed other than the speed of the field and in the same direction, a lower frequency current is generated. In order to change the frequency, motor 80 has been provided which rotates the armature 72 and thereby permits the frequency to be varied to obtain the desired speed of rotation of the motor shaft 65. Shaft 65 corresponds to the shaft 50 shown in Figure 1 and its speed of rotation therefore determines the peripherial speed of the landing wheels.

The apparatus shown in Figure 3 is calibrated in such a way that when the rheostat arm 89 is positioned at zero, the peripherial speed of the landing wheels will be determined by the setting of the rheostat arm 25a and if the landing is to be made in still air, arm 25a is adjusted to the relative plane and air speed which thereby produces the desired peripherial speed of the landing wheels. If the landing is to be made at a time when the air moves relative to the earth, a suitable correction must be made for head or tail wind and this is accomplished by setting the rheostat arm 89 to correspond with the calculated wind velocity in the direction of landing.

The alternating current transmission mechanism shown in Figure 3 is adapted more especially where the wheels to be controlled are located at a considerable distance from the pilot, as by this means the speed of motor 16a can be controlled at great distances, whereas with the mechanism shown in Figure 1, the rheostat control should be located fairly close to the motor 16.

From the above description, it will be apparent that by means of the mechanism illustrated and described, the pilot can control the peripherial speed of rotation of the landing wheels to conform to the speed at which he contemplates landing the plane and when this adjustment is properly made, the wheels will not cause any shock during landing and there will be no excessive wear for the reason that no sliding between the wheels and the landing surface will take place.

Having described the invention what is claimed as new is:

1. In an airplane having a motor and at least two spaced independently movable landing wheels, means for effecting a rotation of the landing wheels at a speed substantially equal to the relative plane and ground speed at landing, comprising a variable speed electric motor operatively connected with each wheel, a source of electric current carried by the airplane, said current supply being connected with the motors to effect rotation of the wheels, and two separate speed control means, one being adjustable in response to relative plane and air speed and the other to relative air and ground speed in the direction of landing, for controlling the rotation of the wheels in accordance with said variables to obtain a peripherial speed substantially equal to the relative plane and ground speed at the time of landing.

2. In an airplane having a motor, an electric generator and at least two spaced, independently rotatable landing wheels, means for effecting a synchronous rotation of the wheels, at a peripherial speed equal to the relative plane and air speed plus or minus the relative air and ground speed component at the time of landing, said means comprising electric motors of substantially identical electrical characteristics, operatively connected with the wheels, means for transmitting an electric current to the motors for producing rotation, means for effecting a variation in peripherial wheel speed commensurate with relative plane and air speed, and a separate means for effecting a further variation in peripherial wheel speed to correct for relative air and ground speed in the direction of airplane landing.

3. In an airplane having an engine, a multiphase electric generator driven thereby and at least two spaced independently rotatable landing wheels, means for rotating the wheels from current derived from the generator comprising a multiphase motor operatively connected with each wheel, the motors having substantially identical electrical characteristics, means comprising electrical conductors for connecting the motors in multiple to the generator terminals, and means for changing the frequency of the current generated in accordance with relative plane and air speed.

4. In an airplane having a motor, an electric generator and at least two spaced, independently rotatable landing wheels, means for effecting a synchronous rotation of the wheels, at a peripherial velocity equal to the relative plane and air speed plus or minus the relative air and ground speed in the direction of landing, said means comprising electric motors of substantially identical electrical characteristics operatively connected with the wheels, means for transmitting an electric current to the motors for producing rotation of the wheels, and means for changing the characteristics of the electric assembly to effect a variation in speed commensurate with relative plane and air speed.

5. In an airplane having an engine, a multiphase electric generator driven thereby and at least two spaced independently rotatable landing wheels, means for rotating the wheels from current derived from the generator comprising a multiphase motor operatively connected with each wheel, the motors having substantially identical electrical characteristics, means comprising electrical conductors for connecting the motors in multiple to the generator terminals, means for changing the frequency of the current generated in accordance with relative plane and air speed, and means for further modifying the frequency to compensate for relative air and ground speed in the direction of landing, whereby the peripherial speed of the landing wheels can be made equal to the plane and ground speed at landing.

6. In an airplane having an engine, means for indicating relative ship and air speed, and at least two landing wheels, means for rotating the landing wheels, before landing, at a peripherial speed substantially equal to the relative plane and ground speed at the time of landing, comprising a variable speed electric motor connected with the landing wheels for rotating them, an electric generator driven from the engine, means for electrically interconnecting the generator and the motor means, said interconnecting means comprising a mechanism for controlling the speed of the motor to obtain a peripherial speed of the landing wheels equal to the indicated relative ship and air speed, and an auxiliary motor speed control means for changing the peripherial speed of the landing wheels in an amount equal to the relative air and ground speed in the direction of landing, whereby the landing wheels may be rotated at the estimated relative plane and ground speed at the time of landing.

7. In an airplane having an engine, means for indicating relative plane and air speed and two or more landing wheels, means for rotating the wheels at a speed approximating the relative plane and ground speed at the time of landing comprising in combination, a variable speed electric motor means operatively connected with at least two of the wheels, a constant potential generator driven by power derived from the engine, means for controlling the speed of the electric motor to rotate the landing wheels at a peripherial speed equal to the relative plane and air speed, said means comprising a motor speed control lever cooperatively related to a scale calibrated to correspond to peripherial speed of the landing wheels, and a second speed control mechanism to change the peripherial speed of the landing wheels to compensate for relative air and ground speed in the direction of landing.

8. In an airplane having an engine, a multiphase electric generator driven thereby and at least two spaced independently rotatable landing wheels, means for rotating the wheels from current derived from the generator comprising, a multiphase motor operatively connected with each wheel, the motors having substantially identical electrical characteristics, means comprising electrical conductors for connecting the motors in multiple to the generator terminals, and means for changing the frequency of the current generator in accordance with relative plane and air speed.

9. In an airplane having an engine, a multiphase electric generator driven thereby and at least two spaced independently rotatable landing wheels, means for rotating the wheels from current derived from the generator comprising, a multiphase motor operatively connected with each wheel, the motor having substantially identical electrical characteristics, means comprising electrical conductors for connecting the motors in multiple to the generator terminals, means for changing the frequency of the current generated in accordance with relative plane and air speed, and means for further modifying the frequency to compensate for relative air and ground speed in the direction of landing whereby the peripherial speed of the landing wheels can be made equal to the plane and ground speed at landing.

10. In an airplane having an engine, at least two landing wheels and means for indicating relative plane and air speed, means for effecting a rotation of the wheels before landing, at a peripherial speed of the estimated relative plane and ground speed at the time of landing, said means comprising, an electric generator driven by power derived from the engine, an electric motor driven by current from the generator and operatively connected with the wheels for rotating them, means interposed in the electric connections between the generator and the motor for effecting a peripherial speed of the landing wheels equaling the relative air and plane speed, and means for changing the speed of the motor to effect a change of peripherial speed of the wheels in an amount equal to the relative air and ground speed in the direction of landing, said means comprising a speed control device calibrated in miles per unit of time of peripherial wheel speed and a second cooperative speed control device calibrated in miles per unit of time of relative air and ground speed.

11. In an airplane having, an engine, a device for indicating relative plane and air speed, and at least two landing wheels, means for effecting a rotation of the wheels, before landing, at the estimated relative plane and ground speed at the time of landing, said means comprising, a direct current generator driven by power derived from the engine, a shunt wound motor operatively connected with the wheels for rotating them, a rheostat in the field of the motor, the rheostat having a control handle calibrated in peripherial landing wheel speed whereby the peripherial speed of the wheels can be made equal to relative plane and air speed, and a second field strength control device, calibrated in peripherial speed, for changing the peripherial speed of the wheels in an amount equal to the relative air and ground speed in the direction of landing.

12. In a wheel rotating device for airplanes having two or more landing wheels, an engine and an instrument indicating relative plane and air speed, a direct current generator driven by power derived from the engine, a direct current shunt wound motor operatively connected with each wheel, a field rheostat in the shunt field, a rheostat control lever, a scale along which the lever moves, said scale being calibrated to show the peripherial speed of the wheels at predetermined positions of the control lever, a second field coil accumulatively wound with respect to the shunt field, means controlled by the position of the rheostat control lever for connecting both field coils in parallel at the time of starting the motor whereby a strong starting torque is obtained, means for disconnecting the second field coil and for gradually introducing resistance in series with the shunt field to bring the peripherial speed of the wheels to the plane and air speed, a second field rheostat in series with the shunt field and means for varying the amount of resistance to effect a further change in peripherial wheel speed to effect adjustments for relative air and ground speed in the direction of landing.

ROY L. TIGER.